United States Patent Office 3,739,020
Patented June 12, 1973

3,739,020
PREPARATION OF CARBOXYLIC ACIDS
Dorothee M. McClain and Irving L. Mador, Cincinnati, Ohio, assignors to National Distillers and Chemical Corporation, New York, N.Y.
No Drawing. Filed May 13, 1969, Ser. No. 824,305
Int. Cl. C07c 51/26, 53/08
U.S. Cl. 260—531 R                10 Claims

ABSTRACT OF THE DISCLOSURE

A vapor phase process for the preparation of carboxylic acids by the direct oxidation of lower alkanols. In accordance with one embodiment, the process comprises reacting ethyl alcohol, in vapor form, with an oxygen-containing gas in the presence of a solid palladium metal-containing catalyst. Preferred reaction conditions include a temperature of 130° C. or less and atmospheric or slightly elevated pressure. The reaction is carried out in the absence of an alkaline material.

---

This invention relates to a novel oxidation process for converting lower alkanols to their corresponding carboxylic acids, e.g., ethyl alcohol to acetic acid. More specifically, the invention pertains to a vapor phase process for oxidizing ethyl alcohol in the presence of a palladium metal-containing catalyst to yield acetic acid in high conversion and selectivity.

Numerous processes have been proposed previously for the direct oxidation of lower aliphatic alcohols to the corresponding carboxylic acids. Some of the disadvantages of such prior art processes are enumerated in U.S. Patent 2,353,159. These advantages include the requirement for relatively high reaction temperatures in the order of 300° C. and 400° C.; a series of processing steps; and low yields if direct oxidation were attempted. Another disadvantage encountered was the polymerization of products accompanied by low yields and other losses. U.S. Patent 2,353,159 sought to avoid the prior art disadvantages by utilizing a low temperature liquid phase process for the direct oxidation of the lower aliphatic alcohol to the acid. The catalyst system comprises a platinum group metal compound, e.g., palladium acetate, dissolved in an aliphatic acid such as acetic acid. The alcohol feed material is passed into the catalyst solution in the presence of oxygen and is converted to the corresponding carboxylic acid. The use of this process for preparing acetic acid from ethyl alcohol is described in the patent.

Klassen and Kirk, A. I. Ch. E. Journal, December 1955, volume 1, No. 4, pages 488 to 495, describe another liquid phase process for the direct oxidation of ethyl alcohol to acetic acid. Here a solution of ethyl alcohol and sodium carbonate was allowed to trickle through a tower packed with a catalyst comprising palladium metal supported on an inert carrier while an oxygen-containing gas was blown upward. Sodium acetate is produced by the reaction of acetic acid with the sodium carbonate. The use of an alkaline reaction medium in the trickle phase process of Klassen and Kirk appears to be based on the prior work (1930). The earlier investigators, who oxidized ethanol in the liquid phase utilizing various platinum group metal catalysts, found that a basic reaction medium, e.g., containing sodium hydroxide, was necessary in order to obtain acetic acid. In a neutral solution no reaction occurred; while in an acid solution the ethyl alcohol was oxidized to acetaldehyde.

Klassen and Kirk further reported that the sodium hydroxide even in the form of dilute solutions, was deleterious in their process because it attacked the alumina carrier. After ammonia and various lower amines failed to provide the necessary results, sodium carbonate was tried and proved effective.

The use of the catalyst solution and basic reaction medium of the above described processes also has certain disadvantages. In addition to the need for employing extraneous materials and special processing steps, full utilization of the catalyst is difficult to achieve. Moreover, the presence of a basic solution results in the production of sodium acetate which then must be converted to the acid. The Klassen and Kirk procedure poses an additional problem in that the acetic acid trickling over the palladium catalyst tends to remove catalyst from the support, consequently lowering the catalyst availability and the yield of acetic acid after the system has been operated in a commercial manner. It would be desirable therefore to have a process for the direct oxidation of lower alkanols to carboxylic acids utilizing a solid palladium metal on alumina catalyst which did not require a trickle phase procedure or the use of an alkaline reaction medium.

One object of the present invention is to provide an improved process for the direct oxidation of lower alkanols to produce aliphatic carboxylic acids which avoids the disadvantages of the prior art processes.

Another object of the present invention is to provide a vapor phase process for the preparation of carboxylic acids from lower alkanols utilizing a palladium metal-containing catalyst.

A further object of the present invention is to provide a process for the preparation of acetic acid by the direct oxidation of ethyl alcohol in the vapor phase utilizing a palladium metal catalyst supported on an inert carrier.

These and other objects of the present invention will become readily apparent from the ensuing description and illustrative embodiments.

In accordance with the present invention it has now been found that carboxylic acids can be produced at a high conversion and selectivity by reacting straight or branched chain lower alkanols containing two to four carbon atoms per molecule and oxygen in the vapor phase in the presence of a solid palladium metal-containing catalyst. More specifically, a lower alkanol, in vapor form, and oxygen are passed into a reaction zone containing a solid palladium metal-containing catalyst supported on an inert carrier. The gaseous reaction product mixture contains the corresponding monocarboxylic acid, which is recovered therefrom by conventional procedures. Another feature of the invention resides in excluding an alkaline material from the reaction zone.

The catalyst used in the process of this invention is a palladium metal-containing catalyst, and preferably palladium metal. It will be understood, however, that other metals may be employed in conjunction with the palladium metal as mixtures, alloys or solid solutions. These other metals include, for example, platinum, gold, iridium, rhodium, ruthenium, iron, cobalt, nickel, manganese, chromium, vanadium, molybdenum, tungsten, and mixtures thereof. Preferably the metal(s) are supported on an inert solid carrier such as alumina, silica, silicon carbide, kieselguhr, titania, zirconia, silica-alumina, carbon, molecular sieves, or mixtures of barium, strontium, or calcium carbonates with silica and/or alumina. In accordance with one feature of this invention it has been found that the use of an alumina or zirconia carrier is especially preferred. The catalyst is best distributed on the surface of the carrier or with moderate rather than thorough penetration. In general, the surface area of the carrier will range from about 2 to 400 meters$^2$/gram, and preferably from about 5 to 200 meters$^2$/gram.

The total metal content of the catalyst may range from about 0.01 to 5% by weight, preferably from about 0.1 to 2% by weight, based on the weight of the inert carrier.

Known methods may be employed in preparing the catalyst, and the exact method of catalyst preparation does not constitute a feature of the present invention. It is a desirable feature that the carrier and the metal deposited thereon be free of halogen ion (chloride, bromide or iodide).

The catalyst may in addition carry as promoters compounds of the groups copper, mercury, cerium, zinc, magnesium, thallium, tin, vanadium, chromium, manganese, thorium, molybdenum, tungsten, uranium, nickel, cobalt or iron. The promoter compounds will most generally be an oxide, carbonate or acetate.

The promoter may be physically deposited with the palladium metal, or alternatively constitute part of the carrier as in cobalt oxide-alumina, nickel oxide-alumina-silica, etc. The promoter concentration may constitute up to 50 percent by weight of the carrier.

The alkanol feed, e.g., ethyl alcohol, is passed to the reaction zone in gaseous form alone or in admixture with the oxygen-containing gas and/or an inert gas such as nitrogen, carbon dioxide, water vapor, etc. Acetic acid in vapor form may also be an inert diluent in the feed. The oxygen containing gas may either be molecular oxygen or air. As noted above, an inert gas may also be employed for feeding the oxygen to the reaction zone. Although it is preferable to feed preformed mixtures of the ethyl alcohol and the oxygen to the reaction zone, either of these reactants can be fed separately or combined with gaseous recycle streams as hereinafter described. The composition of the gaseous feed will generally comprise about 3 to 95%, preferably 5 to 20%, by volume of ethyl alcohol; about 3 to 25%, preferably 5 to 20%, by volume of oxygen; and from 0 to 90% by volume of an inert gas.

The composition will generally be chosen to be outside of the flammability limits. The precise limits will be a function not only of the amounts of ethanol and oxygen but of the nature of the diluent and its concentration, and also the temperature and pressure.

The temperature conditions employed in the process of this invention are critical. It has been found that the temperature is preferably 150° C. or less, and preferably within the range of about 90 to 130° C. If temperatures greater than 150° C. are employed combustion of the ethyl alcohol to carbon dioxide increases drastically. Even temperatures of above 130° to 150° C. resulted in lower conversions because substantial quantities of the ethyl alcohol are converted to carbon dioxide and other undesirable by-products. The use of elevated temperatures has a disadvantage of tending to cause undesirable side reactions such as polymerization. It is important, therefore, to carry out the process at temperatures which do not exceed about 150° C. The pressure employed is not critical. Although an increase in reaction rate is obtained at increased pressure, commercially attractive results were obtained when operating the process under ambient pressures up to 75 p.s.i.a. The particular conditions of temperature and pressure will be chosen so as not to result in condensation of any of the feed components or products.

As previously discussed, the exclusion of an alkaline material from the reaction zone is important. Thus, the necessity of feeding a base solution is avoided thereby permitting a vapor phase operation. Moreover, the acetic acid formed is no longer converted to its alkali salt, such as sodium acetate, which in turn must be treated in a separate step in order to obtain the desired acetic acid product. It has further been found that the presence of an alkaline material on the catalyst, obtained by a separate pretreatment step, is deleterious because the actic acid formation is thus inhibited. Pretreatment of the catalyst with phosphoric acid had the same effect, which would appear to preclude the use of alkaline or acidic materials in the reaction zone in the vapor phase process in this invention. In general, the process of this invention may be carried out by passing a metered flow of an oxygen-containing gas with or without an inert gas such as nitrogen through a bubbler filled with ethyl alcohol. The resulting gaseous mixture will contain ethyl alcohol as well as the oxygen containing gas and can then be passed directly into a conventional reaction zone containing the solid palladium metal-containing the solid palladium metal-containing catalyst supported on an inert carrier. The catalyst may either be packed into the column or used in a fluidized bed-type process to effect the desired reaction. Conventional cooling and heating devices can be employed for maintaining the desired reaction temperatures and for condensing the gaseous reaction product mixture. Acetic acid is readily recoverable from the liquid condensate. It is possible to separately recover acetaldehyde, a minor product of the reaction, which can then be vaporized and recycled to the reaction zone; or the acetaldehyde may be recycled without isolation. Unreacted ethyl alcohol can also be recycled. In general, the non-condensed gas mixture following the separation of the liquid phase can be subjected to an intermediate purification step to partially or completely remove carbon dioxide prior to recycling of the unreacted feed components. Ethyl acetate may also constitute a by-product which may be hydrolyzed to recover the acetic acid portion of the molecule and to recycle the ethanol.

The invention will be more fully understood by reference to the following illustrative embodiments.

EXAMPLE I

A series of runs were carried out with a 2% by weight palladium metal catalyst on an alumina carrier having a surface area of about 7 meters$^2$/gram (Runs 1 and 2) and an alumina carrier having a surface area of about 70 meters$^2$/gram. The runs were carried out by passing a metered flow of air through an ethyl alcohol filled bubbler to obtain a gaseous feed mixture containing the principal components delineated in Table 1. This gaseous feed mixture was passed into a vertically mounted glass tube reactor provided with a thermowell and wrapped with a heating tape. The reactor was packed with 10 grams of the aforementioned catalyst, and the reaction temperature was maintained at about 100° C. unless otherwise indicated in Table 1.

The resulting agseous reaction product mixture was withdrawn from the bottom of the reactor and condensed by chilling at a temperature of about 0° C. The liquid phase was analyzed for acetic acid and acetaldehyde. A gas sample was withdrawn for carbon dioxide determinations.

TABLE 1

| Run No. | 1 | 2 | 3 | 4 |
|---|---|---|---|---|
| Catalyst surface (m.$^2$/g.) | 7 | 7 | 70 | 70 |
| Temp., °C | 100 | 125 | 100 | 125 |
| Carrier gas | $N_2$ | $N_2$ | $N_2$ | $N_2$ |
| Feed (mm./hr.): | | | | |
| Nitrogen | 64.7 | 64.7 | 64.7 | 64.7 |
| Oxygen | 17.2 | 17.2 | 17.2 | 17.2 |
| Ethyl alcohol | 10.3 | 9.0 | 10.0 | 10.1 |
| Products (mm./hr.): | | | | |
| Acetic acid | 6.2 | 7.0 | 7.1 | 7.8 |
| Acetaldehyde | 0.3 | Trace | 0.2 | 0.3 |
| Carbon dioxide | 1.4 | 3.6 | 1.3 | 4.4 |

The data in Table 1 show that combustion, indicated by the amount of carbon dioxide in the gaseous reaction product mixture, is minimal at 100° C. but increases at 125° C. The effect is the same with a low surface or intermediate surface carrier.

EXAMPLE II

Another series of runs were carried out utilizing a 2% palladium metal catalyst on an alumina carrier having a surface area of about 7 meters$^2$/gram (Runs 5 and 6) and about 81 meters$^2$/gram (Runs 7, 8 and 9). The same procedure of Example I was employed except that in Runs 6 and 8 the supported catalyst was pretreated with sodium acetate while in Run 9 the supported catalyst was pretreated with phosphoric acid. As indicated in Table 2, 10 grams of the catalyst were used except in Runs 8 and 9.

TABLE 2

| Run No. | 5 | 6 | 7 | [1] 8 | [1] 9 |
|---|---|---|---|---|---|
| Catalyst surface (m.²/g.) | 7 | 7 | 81 | 81 | 81 |
| Activator | None | NaOAc | None | NaOAc | $H_3PO_4$ |
| Temp., °C | 100 | 100 | 100 | 100 | 100 |
| Carrier gas | $N_2$ | $N_2$ | $N_2$ | $N_2$ | $N_2$ |
| Feed (mm./hr.): | | | | | |
| Nitrogen | 64.7 | 64.7 | 64.7 | 64.7 | 64.7 |
| Oxygen | 17.2 | 17.2 | 17.2 | 17.2 | 17.2 |
| Ethyl alcohol | 10.3 | 9.1 | 8.8 | 7.1 | 7.8 |
| Products (mm./hr.): | | | | | |
| Acetic acid | 6.2 | 3.5 | 7.1 | 5.3 | 2.1 |
| Acetaldehyde | 0.3 | 0.8 | 0.2 | 0.4 | 0.1 |
| Carbon dioxide | 1.4 | 0.9 | 1.3 | 1.2 | 0.4 |

[1] 7.5 g. catalyst instead of 10.0.

The data in Table 2 show that pretreatment of the catalyst with sodium acetate inhibits acetic acid formation with both low and intermediate surface carriers. Pretreatment of the catalyst with phosphoric acid had the same effect.

Tables 1 and 2 demonstrate that the vapor phase process of this invention can be effectively utilized for the direct oxidation of ethyl alcohol to acetic acid in the presence of a solid palladium metal-containing catalyst.

EXAMPLE III

A third series of runs were carried out using different supports, all of them impregnated with 0.5% palladium. The surface area of these carriers varied from 50–140 meters²/gram. The same technique of Example I was employed and 10 grams of catalyst was used in each run.

TABLE 3

| Run No. | 10 | 11 | 12 | 13 | 14 |
|---|---|---|---|---|---|
| Catalyst carrier | $ZrO_2$ | $Al_2O_3$ | [1] $Al_2O_3$ | [2] $Al_2O_3$ | [3] $Al_2O_3$ |
| Catalyst surface (m.²/g.) | 50 | 90 | 90 | 140 | 60 |
| Temp., °C | 115 | 115 | 115 | 115 | 115 |
| Carrier gas | $N_2$ | $N_2$ | $N_2$ | $N_2$ | $N_2$ |
| Feed (mm./hr.): | | | | | |
| Nitrogen | 64.7 | 64.7 | 64.7 | 64.7 | 64.7 |
| Oxygen | 17.2 | 17.2 | 17.2 | 17.2 | 17.2 |
| Ethyl alcohol | 7.6 | 7.8 | 7.6 | 7.7 | 8.3 |
| Products (mm./hr.): | | | | | |
| Acetic acid | 5.7 | 5.7 | 6.0 | 5.6 | 5.9 |
| Acetaldehyde | 0.2 | 0.1 | 0.1 | 0.1 | 0.1 |
| Ethyl acetate | 0.2 | 0.5 | 0.4 | 0.4 | 0.4 |
| Carbon dioxide | 1.1 | 0.8 | 1.0 | 1.1 | 1.1 |

[1] Plus 20% $ThO_2$.
[2] Plus 14% NiO.
[3] Plus 10% CoO.

EXAMPLE IV

A catalyst was prepared by impregnating a zirconia carrier with 0.5% Pd and 0.125% Au. The surface area of the carrier was 50 m.²/g. The same technique and conditions as in Example I were used and the following hourly yields were obtained for 10 grams catalyst with an ethanol feed of 7.67 mmoles per hour.

|  | Mm./hr. |
|---|---|
| Acetic acid | 5.5 |
| Acetaldehyde | 0.1 |
| Ethyl acetate | 0.2 |
| Carbon dioxide | 1.1 |

EXAMPLE V

A catalyst containing 0.5% Pd on a zirconia carrier was employed in the oxidation of n-propyl alcohol. The technique was the same as in Example I except that the reacting temperature was 115° C. Propionic as well as acetic acid was obtained in an approximate ratio of 20 to 1. The extent of combustion was approximately the same as in Example III. Byproducts were propionaldehyde, acetaldehyde and propyl propionate.

While particular embodiments of this invention are shown above, it will be understood that the invention is obviously subject to variations and modifications without departing from its broader aspects.

What is claimed is:

1. A vapor phase process for the preparation of an aliphatic monocarboxylic acid which comprises passing a lower alkanol having from 2 to 4 carbon atoms in vapor form into a reaction zone containing a substantially halogen-free solid metal catalyst consisting essentially of palladium metal and admixtures thereof with platinum, gold, iridium, rhodium, ruthenium, iron, cobalt, nickel manganese, chromium, vanadium, molybdenum, or tungsten metal, said catalyst being supported on an inert carrier, reacting the alkanol with an oxygen-containing gas in the presence of said catalyst at a temperature of about 130° C. or less and in the absence of an alkaline material, and recovering a gaseous reaction product mixture containing the corresponding monocarboxylic acid.

2. The process of claim 1 wherein said catalyst is palladium metal.

3. The process of claim 1 wherein said catalyst is a combination of palladium and gold metals.

4. The process of claim 1 wherein said inert carrier is alumina.

5. The process of claim 1 wherein said inert carrier is zirconia.

6. The process of claim 1 wherein said oxygen-containing gas is oxygen.

7. The process of claim 1 wherein said temperature is within the range of about 90° to 130° C.

8. The process of claim 1 wherein said reaction is carried out at atmospheric pressure.

9. The process of claim 1 wherein said alkanol is ethyl alcohol.

10. The process of claim 1 wherein said alkanol is n-propyl alcohol.

References Cited

UNITED STATES PATENTS 1,985,769   12/1934   Dreyfus.

OTHER REFERENCES

Morrison et al.: Gen. Org. Chem., p. 345.
Keyes & Faith: Cat. Oxid of Ethanol in Vapor Phase, U. of Illinois Bulletin (12/32) No. 14.
Keyes & Snow: Cat. Oxide of Ethanol (11/31), U. of Illinois Bulletin No. 19.
Simington et al.: Cat. Oxide of Eth., Isoprop., of N-butyl alcohols J.A.C.S., May 5, 1928
Nikiforova et al.: C.A., vol. 60, 3995c.

HENRY R. JILES, Primary Examiner
R. D. KELLY, Assistant Examiner

U.S. Cl. X.R.
260—495, 603 HF